United States Patent
Yang

(10) Patent No.: US 9,804,663 B2
(45) Date of Patent: Oct. 31, 2017

(54) ELECTRONIC DEVICE AND VOLTAGE ADJUSTMENT CIRCUIT FOR STORAGE DEVICE THEREOF

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 258 days.

(21) Appl. No.: 14/805,994

(22) Filed: Jul. 22, 2015

(65) Prior Publication Data

US 2016/0349826 A1    Dec. 1, 2016

(30) Foreign Application Priority Data

May 25, 2015  (CN) .......................... 2015 1 0268724

(51) Int. Cl.
  *G06F 1/00*  (2006.01)
  *G06F 1/32*  (2006.01)
(52) U.S. Cl.
  CPC ........ *G06F 1/3268* (2013.01); *Y02B 60/1246* (2013.01); *Y02B 60/32* (2013.01)

(58) Field of Classification Search
  None
  See application file for complete search history.

(56) References Cited

U.S. PATENT DOCUMENTS

2009/0100216 A1* 4/2009 Han ...................... G06F 1/3203
                                                                 711/103
2013/0044388 A1* 2/2013 Yang ..................... G06F 1/3268
                                                                  360/55

* cited by examiner

*Primary Examiner* — Nitin Patel
(74) *Attorney, Agent, or Firm* — Steven Reiss

(57) ABSTRACT

A storage device includes an extension chip and an energy-efficiency control circuit. The extension chip includes an input interface electrically coupled to a motherboard and an output interface. The energy-efficiency control circuit is electrically coupled between the motherboard and the extension chip. The energy-efficiency control circuit includes an interface module, a control module, and a switch module. The interface module is electrically coupled to the input interface of the extension chip, and configured to receive a control signal from the motherboard. The control module is electrically coupled to the interface module, to configured receive the control signal, and to output an output signal according to the control signal received. The switch module is electrically coupled to the control module and a first power supply terminal, to receive the output signal, and to output a voltage of the first power supply terminal to a storage unit.

17 Claims, 2 Drawing Sheets

ELECTRONIC DEVICE AND VOLTAGE ADJUSTMENT CIRCUIT FOR STORAGE DEVICE THEREOF

FIELD

The subject matter herein generally relates to electronic devices, and particularly to an electronic device with a storage device.

BACKGROUND

A server includes a plurality of hard disk devices for data storage. When the hard disk devices are in state of reading or writing, the hard disk devices can use a tremendous amount of power energy. When the hard disk devices are in idle state, the hard disk devices continue to consume energy.

BRIEF DESCRIPTION OF THE DRAWINGS

Implementations of the present technology will now be described, by way of example only, with reference to the attached figures.

DETAILED DESCRIPTION

Figure 1:
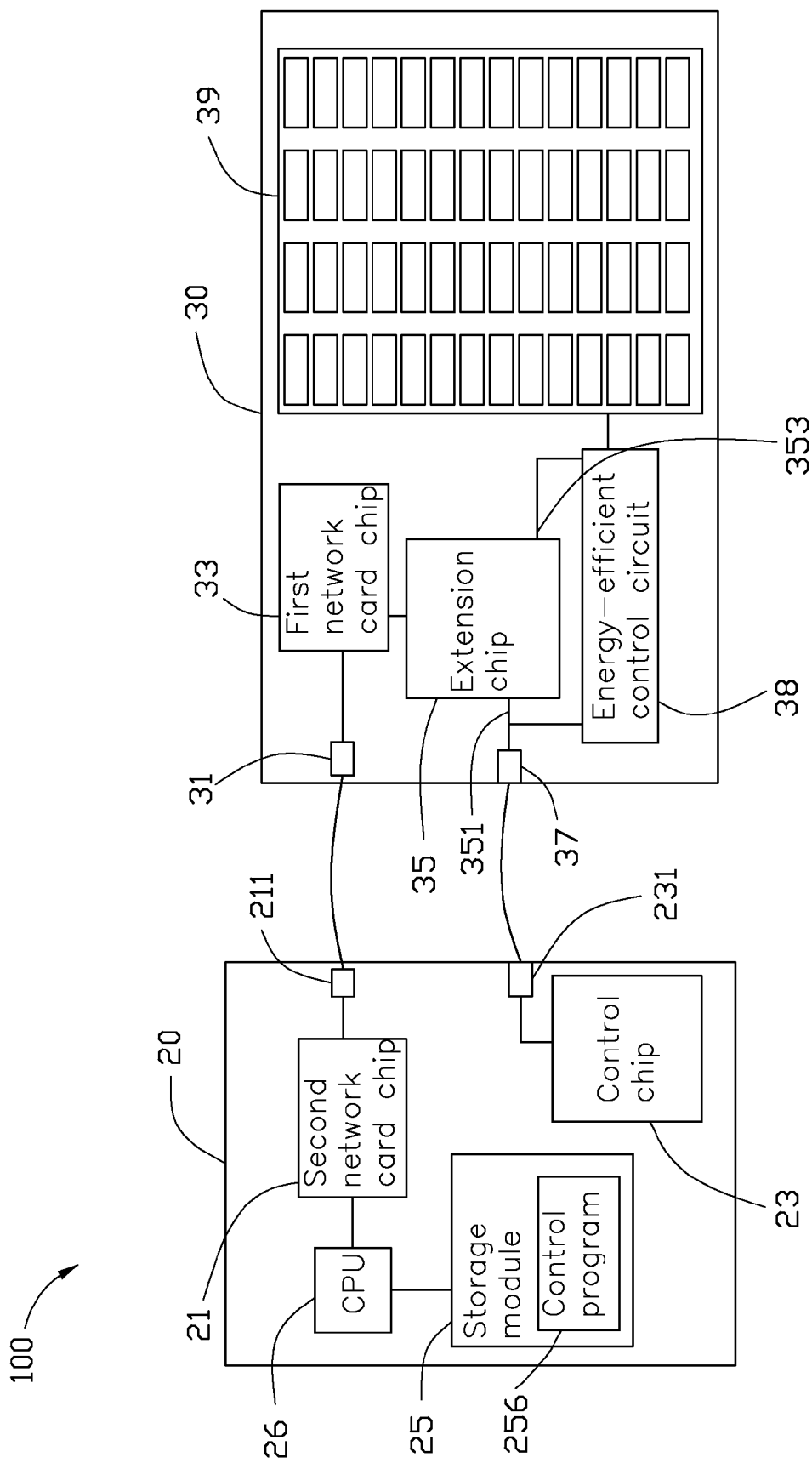
FIG. 1 is a block diagram of an embodiment of an electronic device, wherein the electronic device comprises an energy-efficiency control circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising" means "including, but not necessarily limited to"; it specifically indicates open-ended inclusion or membership in a so-described combination, group, series and the like.

The present disclosure is described in relation to an electronic device.

FIG. 1 illustrates an embodiment of an electronic device 100. The electronic device 100 comprises a motherboard 20 and a storage device 30. The storage device 30 comprises a first interface 31, a first network card chip 33, an extension chip 35, a first connector 37, an energy-efficiency control circuit 38, and a storage unit 39. The first interface 31 is electrically coupled to the extension chip 35 through the first network card chip 33. The extension chip 35 is electrically coupled to the first connector 37 and the energy-efficiency control circuit 38. The energy-efficiency control circuit 38 is electrically coupled to the first connector 37 and the storage unit 39. The extension chip 35 comprises an input interface 351 electrically coupled to the first connector 37 and an output interface 353 electrically coupled to the energy-efficiency control circuit 38. In at least one embodiment, the first connector 37 is a serial attached small computer system interface (SAS), and the storage unit 39 comprises a plurality of hard disk devices.

The motherboard 20 comprises a second network card chip 21, a second interface 211, a control chip 23, a second connector 231, a storage module 25, and a Central Processing Unit (CPU) 26. The CPU 26 is electrically coupled to the second network card chip 21 and the storage module 25. The second network card chip 21 is electrically coupled to the second interface 211. The first interface 31 is electrically coupled to the second interface 211. The first connector 37 is electrically coupled to the second connector 231. The control chip 23 is electrically coupled to the second connector 231. In at least one embodiment, the first interface 31 is electrically coupled to the second interface 211 through a network wire, the second connector 231 is a SAS connector, and the first connector 37 is electrically coupled to the second connector 231 through a mini SAS cable.

The storage module 25 comprises a control program 256 for controlling power to the storage unit 39. The CPU 26 is configured to execute the control program 256. When the control program 256 is powered through an operating system of the electronic device 100, the control program 256, outputs a power on instruction or power off instruction from a user to the second network card chip 21 through the CPU 26. The second network card chip 21 transmits the power on instruction or the power off instruction to the extension chip 35 through the first network card chip 33. When the extension chip 35 receives the power on instruction, the output interface 353 of the extension chip 35 outputs a digital high level signal. When the extension chip 35 receives the power off instruction, the output interface 353 of the extension chip 35 outputs a digital low level signal. In at least one embodiment, when the extension chip 35 does not receive the power off instruction, the output interface 353 of the extension chip 35 outputs a digital high level signal.

When the storage device 30 is accessed by the control chip 23, the control chip 23 outputs a differential signal to the energy-efficiency control circuit 38 through the second connector 231 and the first connector 37, to enable the storage unit 39 transmitting data with the control chip 23. When the storage device 30 does not need to be accessed by the control chip 23, the control chip 23 stops outputting the differential signal.

Figure 2:
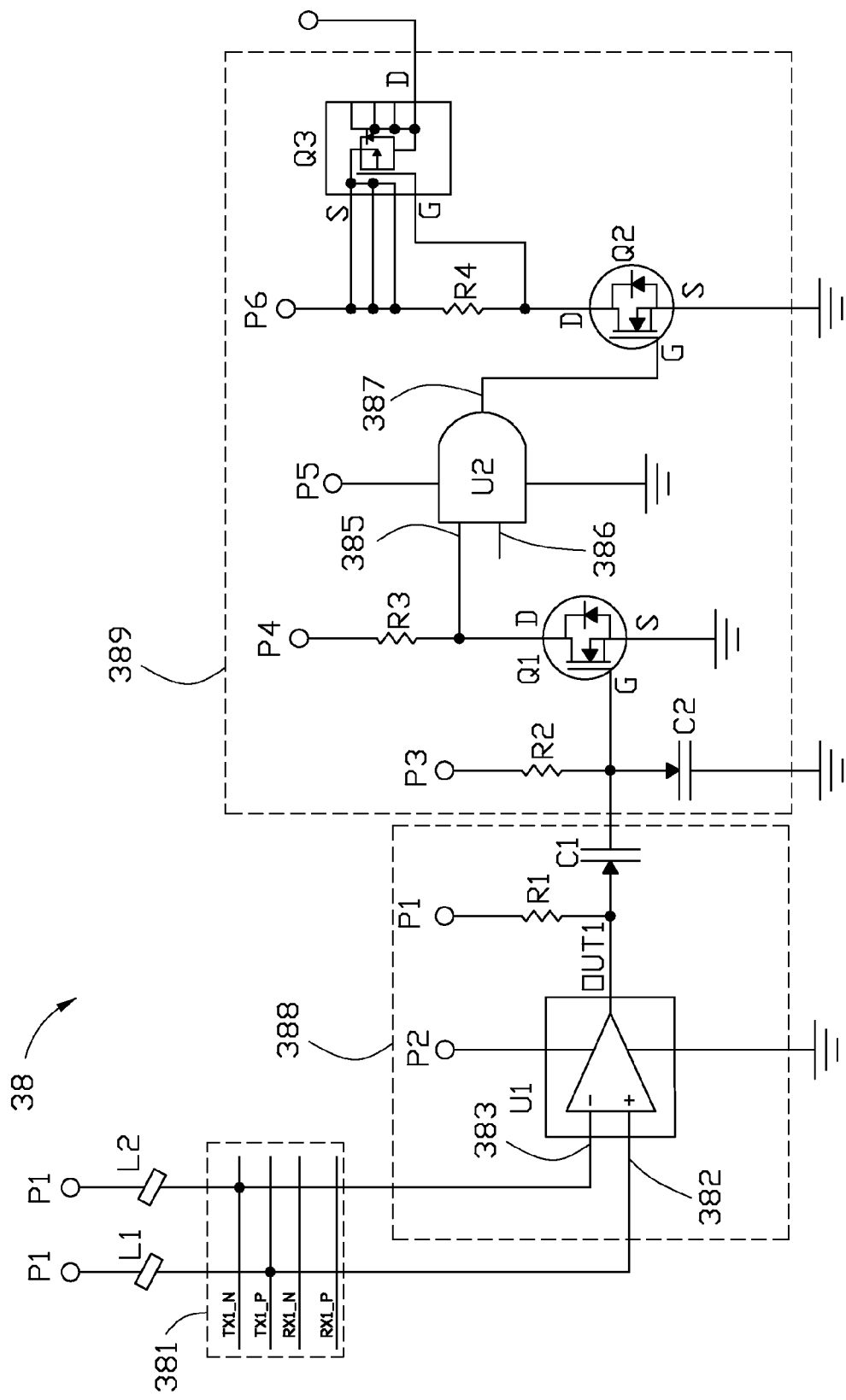
FIG. 2 is a circuit diagram of the energy-efficiency control circuit of FIG. 1.

FIG. 2 illustrates an embodiment of the energy-efficiency control circuit 38. The energy-efficiency control circuit 38 comprises an interface module 381, a control module 388, and a switch module 389. The control module 388 comprises a voltage comparator U1. The switch module 389 comprises a first electronic switch Q1, an AND gate U2, a second electronic switch Q2, and a third electronic switch Q3. The interface module 381 comprises four signal pins TX1-P, TX1-N, RX1-P, and RX1-N electrically coupled to the first connector 37. The signal pin TX1-P and the signal pin TX1-N are electrically coupled to a power supply terminal P1, through two magnetic beads L1 and L2 respectively.

The voltage comparator U1 comprises a non-inverting input terminal 382, an inverting input terminal 383, a voltage terminal electrically coupled to a power supply terminal P2, a ground terminal grounded, and an output terminal OUT1. The non-inverting input terminal 382 is electrically coupled to the signal pin TX1-P. The inverting input terminal 383 is electrically coupled to the signal pin TX1-N. A first terminal G of the first electronic switch Q1 is electrically coupled to the output terminal OUT1 through a first capacitor C1. The output terminal OUT1 is further electrically coupled to the power supply terminal P1 through a first resistor R1.

The first terminal G is also electrically coupled to a power supply terminal P3 through a second resistor R2 and is further coupled to the ground through a second capacitor C2. A second terminal S of the first electronic switch Q1 is grounded. A third terminal D of the first electronic switch Q1 is electrically coupled to a power supply terminal P4 through a third resistor R3. In at least one embodiment, a break over voltage of the first electronic switch Q1 is greater than 1V and less than 3.3V.

The AND gate U2 comprises a first input terminal 385, a second input terminal 386, an output terminal 387, a power supply terminal electrically coupled to a power supply terminal P5, and a ground terminal electrically coupled to the ground. The first input terminal 385 of the AND gate U2 is electrically coupled to the third terminal D of the first electronic switch Q1. The second input terminal 386 of the AND gate U2 is electrically coupled to the output interface 353 of the extension chip 35. The output terminal 387 of the AND gate U2 is electrically coupled to a first terminal G of the second electronic switch Q2. A second terminal S of the second electronic switch Q2 is coupled to the ground. A third terminal D of the second electronic switch Q2 is electrically coupled to a power supply terminal P6 through a fourth resistor R4. The third terminal D of the second electronic switch Q2 is electrically coupled to a first terminal G of the third electronic switch Q3. A second terminal S of the third electronic switch Q3 is electrically coupled to the power supply terminal P6. A third terminal D of the third electronic switch Q3 is electrically coupled to the storage unit 39.

In at least one embodiment, each of the first electronic switch Q1 and the second electronic switch Q2 is an n-channel metal-oxide semiconductor field-effect transistor (NMOSFET). The first terminal G, the second terminal S, and the third terminal D of each electronic switch are respectively corresponding to the gate, the source, and the drain of the NMOSEFT. The third electronic switch Q3 is a p-channel metal-oxide semiconductor field-effect transistor (PMOSEFT). The first terminal G, the second terminal S, and the third terminal D of the third electronic switch Q3 are respectively corresponding to the gate, the source, and the drain of the PMOSEFT. In other embodiments, each of the electronic switches Q1, Q2, and Q3 can be replaced by other suitable electronic switch having the similar functions.

In at least one embodiment, a voltage of the power supply terminal P1 is 1 volt (V). A voltage of each power supply terminal P2, P3, P4, and P5 is 3.3V. A voltage of the power supply terminal P6 is 12V.

The control chip 23 outputs a difference signal in response to the electronic device 100 being powered on and the storage unit 39 being accessed by the motherboard 20. The difference signal is transmitted to the non-inverting input terminal 382 of the voltage comparator U1 through the second connector 231, the cable, the first connector 37, and the signal pin TX1-P of the interface module 381, and is transmitted to the inverting input terminal 383 of the voltage comparator U1 through the second connector 231, the cable, the first connector 37, and the signal pin TX1-N of the interface module 381. The output terminal OUT1 of the voltage comparator U1 outputs a square wave signal, with an amplitude of 1V. Because of the frequency of square wave signal from the output terminal OUT1 is greater, the square wave signal can be transmitted to the first terminal G of the first electronic switch Q1 through the first capacitor C1. Due to the breakover voltage of the first electronic switch Q1 is greater than 1V, the square wave signal from the output terminal OUT1 cannot enable the first electronic switch Q1 to turn on. A voltage of the power supply terminal P4 is transmitted to the first input terminal 385 of the AND gate U2 through the third resistor R3. The first input terminal 385 of the AND gate U2 receives a digital high level signal, such as logic "1". The second terminal 386 of the AND gate U2 also receives a digital high level signal, as is electrically coupled to the output interface 353 of the extension chip 35. The output terminal 387 of the AND gate U2 outputs a digital high level signal, such as logic 1, to the first terminal G of the second electronic switch Q2. The first terminal G of the second electronic switch Q2 receives a digital high level signal, and the second electronic switch Q2 is turned on. The first terminal G of the third electronic switch Q3 receives a digital low level signal from ground through the second and third terminals of the second electronic switch Q2, and the third electronic switch Q3 is also turned on. The power supply terminal P6 can supply power to the storage unit 39 through the third electronic switch Q3.

When the motherboard 20 does not need to access the storage unit 39, the control chip 23 does not output the control signal. The inverting input terminal 383 and the non-inverting input terminal 382 of the voltage comparator U1 do not receive signal, and the output terminal OUT1 does not output the square wave signal to the first electronic switch Q1. The power supply terminal P3 supplies power to the first terminal G of the first electronic switch Q1, the first terminal G of the first electronic switch Q1 receives a digital high level signal, such as logic "1", and the first electronic switch Q1 is turned on. The first input terminal 385 of the AND gate U2 is grounded through the first electronic switch Q1. The output terminal 387 of the AND gate U2 outputs a digital low level signal, such as a logic value of "0". The second electronic switch Q2 and the third electronic switch Q3 are turned off. Therefore, the power supply terminal P6 cannot supply power to the storage unit 39 through the third electronic switch Q3.

In at least one embodiment, the control program 256 can be configured to control the power supply terminal P6 whether to supply power to the storage unit 39. When the control program 256 receives a power off command from a user, the control program 256 transmits the power off instruction to the extension chip 35 through the second interface 211, the network wire, the first interface 31, and the first network card chip 33. When the extension chip 35 receives the power off instruction, the extension chip 35 outputs a digital low level signal to the second input terminal 386 of the AND gate U2. The output terminal 387 of the AND gate U2 outputs a digital low level signal to the first terminal G of the second electronic switch Q2. The first terminal G of the second electronic switch Q2 receives a digital low level signal, and the second electronic switch Q2 is turn off. The first terminal G of the third electronic switch Q3 is electrically coupled to the power supply terminal P6, and receives a digital high level signal from the power supply terminal P6 so the third electronic switch Q3 is turn off. The power supply terminal P6 cannot supply power to the storage unit 39.

When the control program 256 receives a power on instruction from a user, the control program 256 transmits the power on instruction to the extension chip 35 through the CPU 26, the second network card chip 21, the second interface 211, the network wire, the first interface 31, and the first network card chip 33. The extension chip 35 receives the power on instruction, and outputs a digital high level signal to the second input terminal 386 of the AND gate U2. The first input terminal 385 of the AND gate U2 receives a digital high level signal from the power supply terminal P4. The output terminal 387 of the AND gate U2 outputs a digital high level signal to the first terminal G of the second electronic switch Q2. The second electronic switch Q2 is turned on. The third electronic switch Q3 is turned on, and the power supply terminal P6 supplies power to the storage unit 39.

Therefore, the energy-efficiency control circuit 38 controls the power supply terminal P6 to supply power to the storage unit 39 or not, according to whether the storage unit 39 is accessed by the motherboard 20. Furthermore, the power supply terminal P6 can also be controlled by the control program 256 from a user, to supply power to the storage unit 39. Therefore, the electronic energy can be saved, when the storage unit 39 does not operate.

Even though numerous characteristics and advantages of the embodiments have been set forth in the foregoing description, together with details of the structure and function of the embodiments, the present disclosure is illustrative only, and changes may be made in detail, including in the matters of shape, size, and arrangement of parts within the principles of the embodiments to the full extent indicated by the broad general meaning of the terms in which the appended claims are expressed.

What is claimed is:

1. A storage device comprising:
    an extension chip comprising an input interface electrically coupled to a motherboard and an output interface;
    a storage unit; and
    an energy-efficiency control circuit electrically coupled between the motherboard and the extension chip, the energy-efficiency control circuit comprising:
        an interface module electrically coupled to the input interface of the extension chip and configured to receive a control signal from the motherboard;
        a control module electrically coupled to the interface module and configured to receive the control signal and to output an output signal according to the control signal received, wherein the control module comprises a voltage comparator and a first resistor, a non-inverting terminal and an inverting terminal of the voltage comparator are coupled to the interface module, and an output terminal of the voltage comparator is coupled to the second power supply terminal through the first resistor; and
        a switch module electrically coupled to the control module and a first power supply terminal, the switch module configured to receive the output signal and to output a voltage of the first power supply terminal to the storage unit;
    wherein when the interface module does not receive the control signal from the motherboard, the control module stops to output the output signal to the switch module, whereby the switch module cannot output the voltage of the first power supply terminal to the storage unit.

2. The storage device of claim 1, wherein the control module further comprises a first capacitor, an output terminal of the voltage comparator is coupled to the switch module through the first capacitor.

3. The storage device of claim 2, wherein the interface module comprises a first signal pin and a second signal pin, the first and second signal pins are electrically coupled to the motherboard for receiving a differential control signal from the motherboard, the non-inverting input terminal and the inverting input terminal of the voltage comparator are respectively and electrically coupled to the first and second signal pins.

4. The storage device of claim 3, wherein the first signal pin and the second signal pin of the interface module are respectively and electrically coupled to two magnetic beads.

5. The storage device of claim 3, wherein the switch module comprises a first electronic switch, an AND gate, a second electronic switch, and a third electronic switch, the first electronic switch comprises a first terminal electrically coupled to the output terminal of the voltage comparator and a third power supply terminal, a second terminal coupled to the ground, and a third terminal electrically coupled to a fourth power supply terminal through a second resistor, the AND gate comprises a first input terminal electrically coupled to the third terminal of the first electronic switch, a second input terminal electrically coupled to the output interface of the extension chip, and an output terminal, the second electronic switch comprises a first terminal electrically coupled to the output terminal of the AND gate, a second terminal electrically coupled to the ground, and a third terminal electrically coupled to the first power supply terminal, the third electronic switch comprises a first terminal electrically coupled to the third terminal of the second electronic switch, a second terminal electrically coupled to the first power supply terminal, and a third terminal electrically coupled to the storage unit.

6. The storage device of claim 5, wherein when the motherboard does not need to access the storage unit, the motherboard does not output the control signal, the non-inverting input and the inverting input terminals of the voltage comparator do not receives signal, the third power supply terminal supplies power to the first electronic switch, the first electronic switch is turn on, the first input terminal of the AND gate is electrically coupled to the ground through the first electronic switch, the output terminal of the AND gate outputs a digital low level signal to the first terminal of the second electronic switch, the second electronic switch and the third electronic switch are turned off, the first power supply terminal cannot supply power to the storage unit through the third electronic switch.

7. The storage device of claim 5, wherein when the motherboard needs to access the storage unit, the motherboard outputs the control signal to the non-inverting input terminal and the inverting input terminal of the voltage comparator, the output terminal of the voltage comparator output a square wave signal to the first terminal of the first electronic switch, the first electronic switch is turned off, the fourth power supply terminal supplies power the first input terminal of the AND gate through the second resistor, the first input terminal of the AND gate receives a digital high level signal, the output interface of the extension chip outputs a digital high level signal to the second input terminal of the AND gate, the output terminal of the AND gate outputs a digital high level signal to the first terminal of the second electronic switch, the second electronic switch is turn on, the first terminal of the third electronic switch is electrically coupled to the ground through the second electronic switch, the third electronic switch is turn on, the third power supply terminal supplies power the storage unit through the third electronic switch.

8. The storage device of claim 5, wherein each of the first electronic switch, the second electronic switch, and the third electronic switch is an n-channel metal-oxide semiconductor field-effect transistor (NMOSFET), the first terminals, the second terminals, and the third terminals of the first electronic switch, the second electronic switch, and the third electronic switch are respectively corresponding to the gate, the source, and the drain of the NMOSEFT.

9. An electronic device, comprising:
a motherboard comprising a control chip; and
a storage device comprising:
an extension chip comprising an input interface electrically coupled to a motherboard and an output interface;
a storage unit; and
an energy-efficiency control circuit electrically coupled between the motherboard and the extension chip, the energy-efficiency control circuit comprising:
an interface module electrically coupled to the input interface of the extension chip and configured to receive a control signal from the motherboard;
a control module electrically coupled to the interface module and configured to receive the control signal and to output an output signal according to the control signal received, wherein the control module comprises a voltage comparator and a first resistor, a non-inverting terminal and an inverting terminal of the voltage comparator are coupled to the interface module, and an output terminal of the voltage comparator is coupled to the second power supply terminal through the first resistor; and
a switch module electrically coupled to the control module and a first power supply terminal, the switch module configured to receive the output signal and to output a voltage of the first power supply terminal to the storage unit;
wherein when the interface module does not receive the control signal from the control chip of the motherboard, the control module stops to output the output signal to the switch module, whereby the switch module cannot output the voltage of the first power supply terminal to the storage unit.

10. The electronic device of claim 9, wherein the control module further comprises a first capacitor, and an output terminal of the voltage comparator is coupled to the switch module through the first capacitor.

11. The electronic device of claim 10, wherein the interface module comprises a first signal pin and a second signal pin, the first and second signal pins are electrically coupled to the motherboard for receiving a differential control signal from the control chip of the motherboard, the non-inverting input terminal and the inverting input terminal of the voltage comparator are respectively and electrically coupled to the first and second signal pins.

12. The electronic device of claim 11, wherein the first signal pin and the second signal pin of the interface module are respectively and electrically coupled to two magnetic beads.

13. The electronic device of claim 11, wherein the switch module comprises a first electronic switch, an AND gate, a second electronic switch, and a third electronic switch, the first electronic switch comprises a first terminal electrically coupled to the output terminal of the voltage comparator and a third power supply terminal, a second terminal coupled to the ground, and a third terminal electrically coupled to a fourth power supply terminal through a second resistor, the AND gate comprises a first input terminal electrically coupled to the third terminal of the first electronic switch, a second input terminal electrically coupled to the output interface of the extension chip, and an output terminal, the second electronic switch comprises a first terminal electrically coupled to the output terminal of the AND gate, a second terminal electrically coupled to the ground, and a third terminal electrically coupled to the first power supply terminal, the third electronic switch comprises a first terminal electrically coupled to the third terminal of the second electronic switch, a second terminal electrically coupled to the first power supply terminal, and a third terminal electrically coupled to the storage unit.

14. The electronic device of claim 13, wherein the control chip of the motherboard does not need to access the storage unit, the motherboard does not output the control signal, the non-inverting input and the inverting input terminals of the voltage comparator do not receives signal, the third power supply terminal supplies power to the first electronic switch, the first electronic switch is turn on, the first input terminal of the AND gate is electrically coupled to the ground through the first electronic switch, the output terminal of the AND gate outputs a digital low level signal to the first terminal of the second electronic switch, the second electronic switch and the third electronic switch are turned off, the first power supply terminal cannot supply power to the storage unit through the third electronic switch.

15. The electronic device of claim 13, wherein when the control chip of the motherboard needs to access the storage unit, the control chip of the motherboard outputs the control signal to the non-inverting input terminal and the inverting input terminal of the voltage comparator, the output terminal of the voltage comparator output a square wave signal to the first terminal of the first electronic switch, the first electronic switch is turned off, the fourth power supply terminal supplies power the first input terminal of the AND gate through the second resistor, the first input terminal of the AND gate receives a digital high level signal, the output interface of the extension chip outputs a digital high level signal to the second input terminal of the AND gate, the output terminal of the AND gate outputs a digital high level signal to the first terminal of the second electronic switch, the second electronic switch is turn on, the first terminal of the third electronic switch is electrically coupled to the ground through the second electronic switch, the third electronic switch is turn on, the third power supply terminal supplies power the storage unit through the third electronic switch.

16. The electronic device of claim 13, wherein each of the first electronic switch, the second electronic switch, and the third electronic switch is an n-channel metal-oxide semiconductor field-effect transistor (NMOSFET), the first terminals, the second terminals, and the third terminals of the first electronic switch, the second electronic switch, and the third electronic switch are respectively corresponding to the gate, the source, and the drain of the NMOSEFT.

17. The electronic device of claim 9, wherein the motherboard comprises a control program electrically coupled to the extension chip through a CPU, the control program can output a power on instruction or power off instruction to the extension chip through the CPU, when the extension chip receives the power on instruction, the output interface of the extension chip outputs a digital high level signal, when the extension chip receives the power off instruction, the output interface of the extension chip outputs a digital low level signal.

* * * * *